Figure 1:
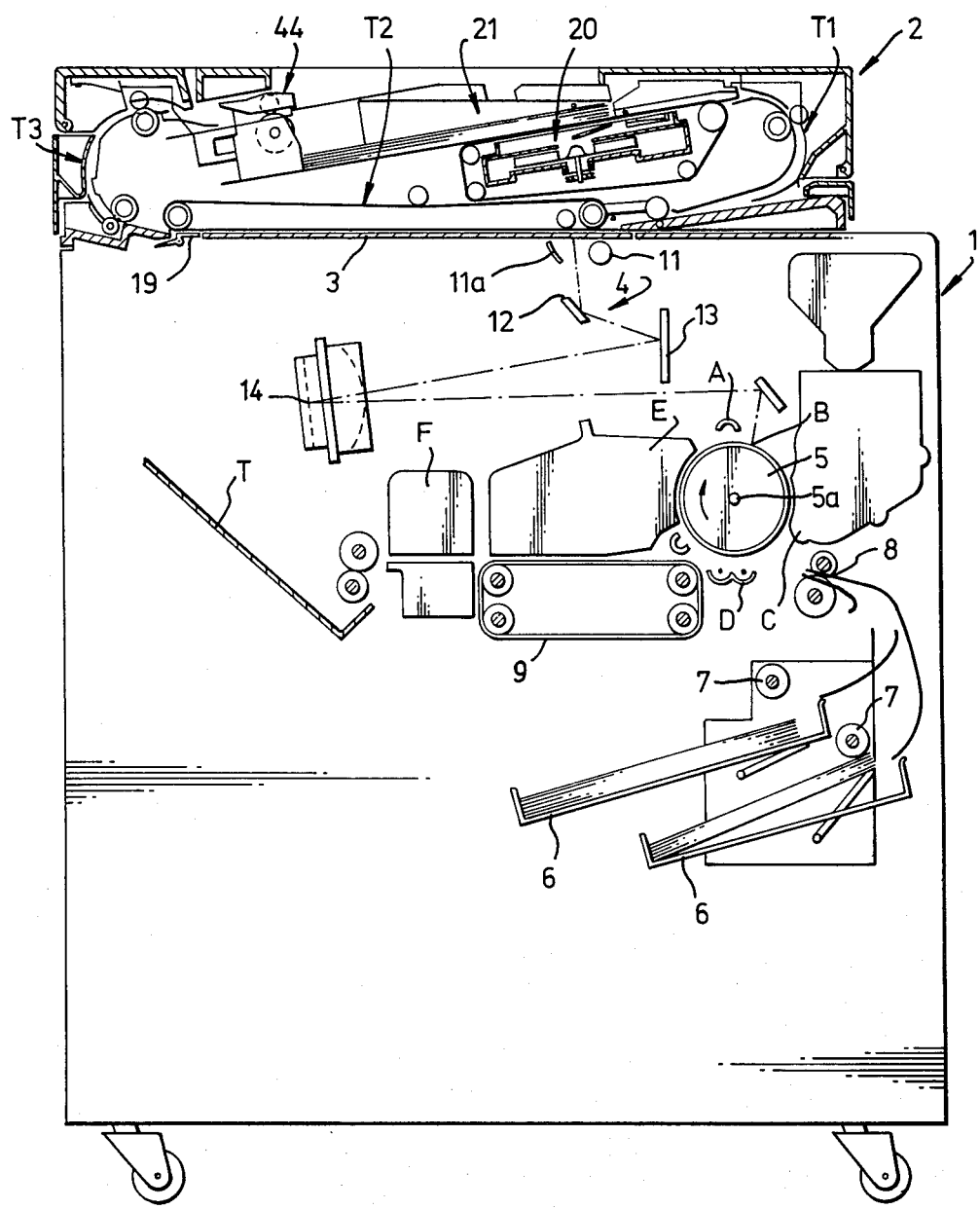

United States Patent [19]

Jones et al.

[11] Patent Number: 4,469,436

[45] Date of Patent: Sep. 4, 1984

[54] RECIRCULATION DOCUMENT HANDLING METHODS AND APPARATUS AND COPIERS INCORPORATING SUCH APPARATUS

[75] Inventors: John A. Jones, Gr. Linford, Milton Keynes; Michael S. West, Wigginton, Near Tring, both of England

[73] Assignee: Xerox Corporation, Stamford, Conn.

[21] Appl. No.: 437,780

[22] Filed: Oct. 29, 1982

[30] Foreign Application Priority Data

Nov. 6, 1981 [GB] United Kingdom ............... 8133512

[51] Int. Cl.³ ............................................ G03B 27/62
[52] U.S. Cl. .................................. 355/51; 355/3 SH; 355/14; 355/75; 271/3.1; 271/301
[58] Field of Search .................... 355/14 SH, 3 SH, 8, 355/11, 51, 75, 57, 65, 66, 102; 271/3.1, 301

[56] References Cited

U.S. PATENT DOCUMENTS

| | | | |
|---|---|---|---|
| 3,409,366 | 11/1968 | Hanson et al. | 355/102 |
| 3,476,382 | 11/1969 | Tregay et al. | 271/52 |
| 3,484,164 | 12/1969 | Byland | 355/8 |
| 3,770,348 | 11/1973 | Martin | 355/102 |
| 3,888,579 | 6/1975 | Rodek et al. | 355/14 |
| 3,909,128 | 9/1975 | Sohm | 355/8 |
| 4,169,674 | 10/1979 | Russel | 355/14 |
| 4,176,945 | 12/1979 | Holzhauser et al. | 355/23 |
| 4,179,215 | 12/1979 | Hage | 355/3 |
| 4,192,607 | 3/1980 | Hage | 355/50 |
| 4,335,954 | 6/1982 | Phelps | 355/3 SH |

FOREIGN PATENT DOCUMENTS

| | | |
|---|---|---|
| 2539799 | 7/1978 | Fed. Rep. of Germany. |
| 3007406 | 8/1980 | Fed. Rep. of Germany. |
| 1204707 | 9/1970 | United Kingdom. |

OTHER PUBLICATIONS

W. D. Clark et al., "Recirculating Document Feed with Dual Entry Gate", *IBM Technical Disclosure Bulletin*, vol. 24, No. 1B, Jun. 1981, pp. 808-809.

*Primary Examiner*—L. T. Hix
*Assistant Examiner*—Brian W. Brown

[57] ABSTRACT

A recirculating document handler (2) is described which includes document circulating means (T1, T2, T3) for delivering documents in turn to a copying station (3) of a photocopier from a storage tray (21) and for returning the documents to the tray, whereby the documents may be circulated and recirculated in sequence past the copying station for repeated copying. The circulating means (T1, T2, T3) is adapted automatically to continuously circulate and recirculate through the storage tray (21) a single document longer (in the direction in which it moves) than the storage tray. A document copier incorporating such a document handler is also described as also is a method of copying documents utilizing these characteristics.

6 Claims, 6 Drawing Figures

RECIRCULATION DOCUMENT HANDLING METHODS AND APPARATUS AND COPIERS INCORPORATING SUCH APPARATUS

This invention relates to recirculation document handling methods and apparatus and to document copiers incorporating such apparatus. Generally, recirculation document handlers include a storage tray for the document to be copied and document circulating means for delivering the documents in turn to a copying station of a photocopier from the storage tray and for returning the documents to the tray, whereby the documents may be circulated and recirculated in sequence past the copying station for repeated copying.

As xerographic and other document copiers have increased in speed and become more automatic, it has become increasingly important to provide higher speed, yet more reliable and more automatic handling of both the copy sheets and the individual original documents being copied. Greatly improved automatic handling of documents has been achieved with the advent of recirculation document handlers by which pre-collation copying is possible. As discussed in detail in U.S. Pat. No. 3,963,345 such pre-collation copying systems provide a number of important advantages. The copies leave the copier in pre-collated sets and do not require subsequent sorting in a sorter or collator. Any desired number of such copy sets may be made by making a corresponding number of circulations of the document set in collated order past the copying station and copying each document each time it is circulated. On-line finishing and/or removal of completed copy sets may be provided while additional copy sets are being made from the same document set.

Some examples of recirculation document handling in which documents are delivered in turn to a copying station of a photocopier from a storage tray and then returned to the tray, being circulated and recirculated in sequence past the copying station for repeated copying, include German Pat. No. 1128295 of Oct. 25, 1962 and U.S. Pat. Nos. Re. 27,976 (originally U.S. Pat. No. 3,499,710 issued Mar. 10, 1970), 3,536,320 issued Oct. 27, 1970, 3,552,739 issued Jan. 5, 1971, 3,556,511 issued Jan. 19, 1971, 3,888,579 issued June 10, 1975 and 3,937,454 issued Feb. 10, 1976. U.S. Pat. Nos. 4,076,408 issued Feb. 28, 1978, 4,078,787 issued Mar. 14, 1978 and 4,169,674 issued Oct. 2, 1979, are examples of recirculation document handler systems in which the documents are placed face-up in a document storage tray arranged over the platen of the copier, each document being withdrawn from the bottom of the document set stack in the tray for copying once in each circulation and then returned to the top of the document stack for repeated copying circulations.

Also of interest is U.S. Pat. No. 4,179,215, issued Dec. 18, 1979, which describes a recirculating document feeder or handler having a by-pass so that when copying a limited number of documents, the documents do not have to be returned to the storage tray between circulations. A vacuum belt sheet transport picks up documents removed from the tray by a vacuum feeder and circulates the documents to the exposure or copying station of the copier and then away from the exposure station. The transport is of a size to simultaneously circulate several document sheets. At the appropriate time in the machine cycle a separator removes the document from the sheet transport and directs the removed document sheet back to the storage tray and on the top of any other documents in the tray. A feeding control is provided for selectively operating the feeder in any one of several modes of operation depending on the relationship between the number of document sheets in the tray and the number of documents that can be transported at one time by the transport. More specifically, the document sheets can be removed seriatim from the stack in the tray, circulated once to the exposure station and then returned to the tray on top of the other documents. Alternatively, the documents can be removed seriatim from the bottom of the stack in the tray, retained on the transport while they are circulated to the exposure station the number of times required to make the desired number of copies and then returned to the tray to be stacked in the original order. In another mode a single sheet can be removed from the tray, transported to the exposure station for copying one or more times and returned to the tray.

U.S. Pat. Nos. 4,176,945, issued Dec. 4, 1979 and 4,192,607, issued Mar. 11, 1980 approach the problem of how to feed documents that are too large to be accommodated by the recirculating document handler or feeder, or that may not be reliably handled by the recirculating feeder. This is achieved by providing a document positioner which serves to feed documents on to the copier platen at one side thereof and off the platen at the other side thereof along a non-recirculating, straight line path.

The present invention is concerned with the problem of how to feed documents that would normally be too large to be fed by a recirculation document handler and which in particular are larger than the storage tray of the document handler.

To this end, a recirculation document handler according to the invention, and a copier incorporating such a document handler, are characterised in that the document circulating means is adapted automatically to continuously circulate and recirculate through the storage tray a single document longer (in the direction in which it moves) than the storage tray.

By means of this invention it is possible to use the document handler to copy documents that would normally be considered too large. Further multiple copies can be made automatically of such a document where the document handler is used in conjunction with a copier of the kind having a fixed or stationary optical system. At the same time, the present invention permits the copying of documents longer (in the direction of movement of the document than the platen of the photocopier, where the document handler is used in conjunction with a photocopier of the kind described for example in U.S. Pat. No. 3,909,128, issued Sept. 30, 1975, having an optical system which is movable for scanning a stationary document on the platen but may be fixed in position for scanning a document passed at a constant speed across the platen. Another photocopier suitable for this purpose is described in U.S. Pat. No. 4,018,523, issued Apr. 19, 1977.

It will be realised that the term 'continuous' used herein and in the claims refers to the operation of the apparatus and not to the motion of the document. Thus the document may be rendered stationary during copying thereof on the platen of a copier and/or may be stopped momentarily during its passage through the storage tray for registering the document prior to its being fed out of the tray for recirculation.

In a preferred form, the circulating means includes a first return path to the storage tray for documents not longer than the storage tray and a second return path to the storage tray for documents longer than the tray. The first and second return paths include a common portion which includes common document advancing means and the unique portion only of the first return path includes further document advancing means for accelerating documents not larger than the storage tray into the tray. A movable backstop of the storage tray forms a unit comprising the unique portions of the first and second paths and includes a fixed diverter which in the rearmost position of the backstop causes the second unique path portion to receive a document from the common portion and in other positions causes the first unique path portion to receive documents from the common portion.

The present invention also provides a method of copying documents comprising circulating and recirculating a document past a copying station of a photocopier by delivering the document from a storage tray to the copying station, copying the document and then returning the document to the storage tray during each circulation, characterised in that a single document longer than the storage tray is continuously circulated and recirculated past the copying station and through the storage tray.

Figures 2, 2A:
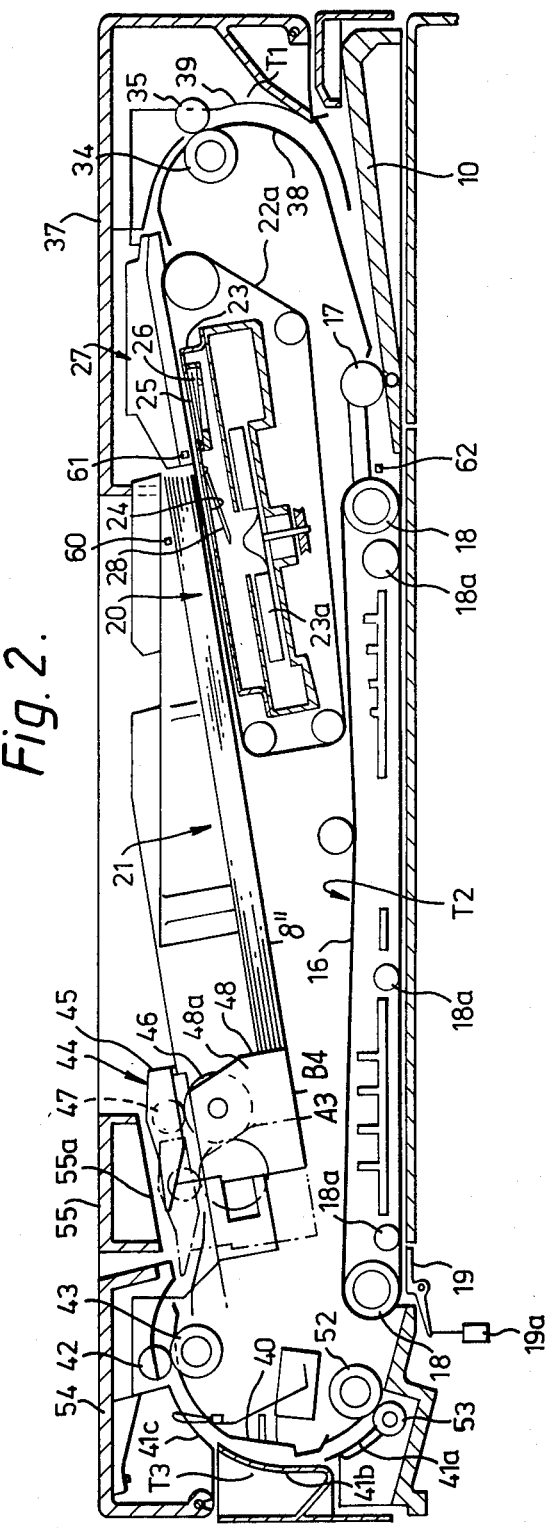
Figure 3:
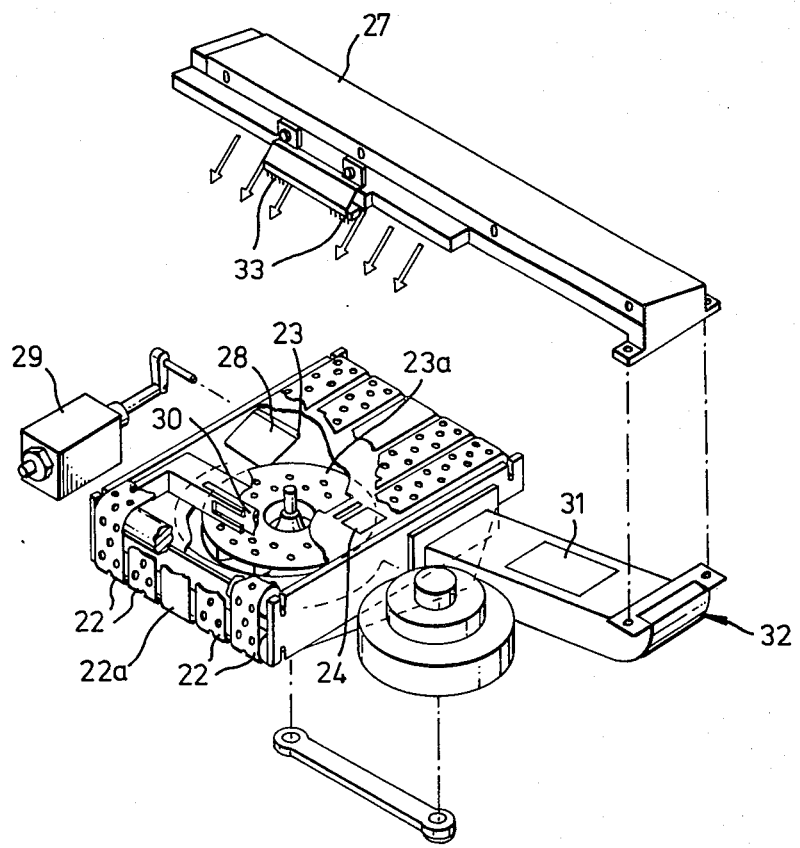
Figure 4:
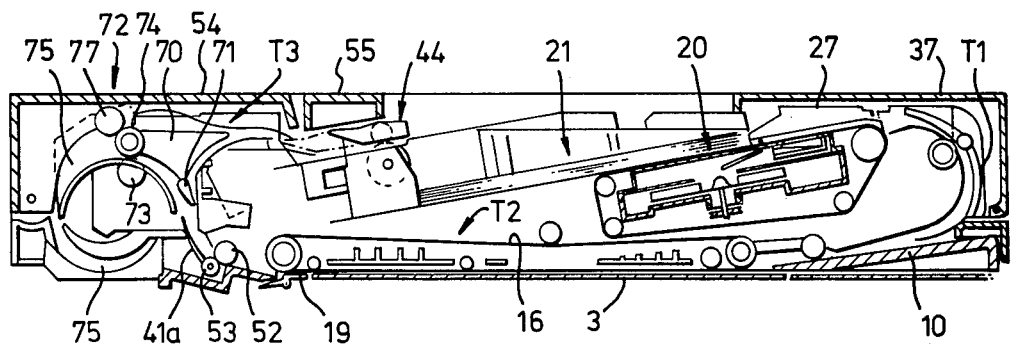
Figure 5:
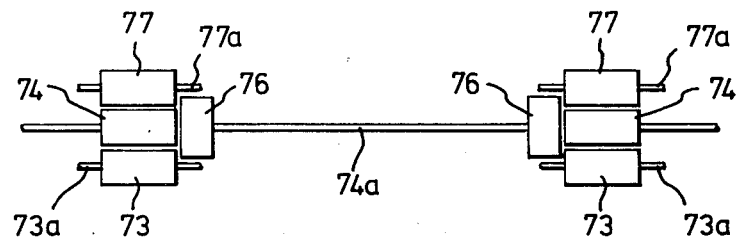

In order that the invention may be more readily understood, reference will now be made to the accompanying drawings, in which:

FIG. 1 is a front elevation of a document copier according to the invention which includes a recirculating document handler, FIG. 2 is an enlarged side elevation of the recirculating document handler of FIG. 1 showing it in greater detail, FIG. 2A is a partial, enlarged detail view of the document handler showing a detail of the document separator/feeder thereof, FIG. 3 is a perspective view showing the separator/feeder in greater detail, FIG. 4 is a side elevation of a second embodiment of recirculating document handler according to the invention including a document inverter, and FIG. 5 is a partial schematic end view of the document inverter portion of the document handler of FIG. 4.

Referring now to FIG. 1, there is illustrated a schematic side view of an automatic xerographic copying machine 1 having mounted thereon a recirculating document handler 2 arranged to feed documents to be copied to a platen 3 of the copier 1 for exposure by an optical system 4.

The xerographic copier includes a rotatably mounted photoconductive drum 5 which is supported upon a horizontally extended shaft 5a. The drum 5 is driven in the direction indicated by the arrow whereby its photoconductive surface is caused to pass sequentially through a series of xerographic processing stations.

Initially, the photoconductive drum surface is uniformly charged by means of a corona generator positioned within a charging station A located at approximately the 12 o'clock drum position. The charged drum surface is then advanced to an exposure station B wherein a flowing light image of an original document on the platen is projected by optical system 4 onto the charged drum surface thus recording on the drum a latent electrostatic image containing the original input scene information. Next, subsequent to the exposure step in the direction of drum rotation is a developing station C wherein the latent electrostatic image is rendered visible by applying an electroscopic marking powder (toner) to the photoreceptor surface in a manner well known and used in the art. The now visible image is then forwarded into a transfer station D wherein a sheet of final support material is brought into overlying moving contact with the toner image and the image transferred from the plate to the support sheet by means of a corona generator.

Sheets of the final support material are supported in a stack arrangement on two elevating stack support trays 6. The provision of two trays permits sheets of two different sizes to be supplied merely by selecting the appropriate tray. With one of the stacks at its elevated position an associated sheet separator feed roll 7 feeds individual sheets therefrom to pinch rolls 8 and then to the transfer station D in synchronous moving relationship to the developed image on the photoconductive plate surface. The motion of the rolls 8 is coordinated with that of the rotating drum surface, as well as the other machine components through the main drive system whereby the support sheet is introduced into the transfer station D in proper registration with the developed toner image supported on the xerographic plate.

After transfer, but prior to the reintroduction of the image portion of the drum into the charging station A, the plate surface is passed through a cleaning station E wherein the residual toner remaining on the plate surface is removed. The removed toner particles are collected within a container where they are stored subject to periodic removal from the machine.

Upon completion of the image transfer operation, the toner bearing support sheet is stripped from the drum surface and placed upon a moving vacuum transport 9 which serves to advance the support sheet into a thermal fusing station F wherein the toner image is permanently fixed to the sheet. The copy sheet with the fused image thereon is forwarded from the fuser into a collecting tray T where the sheet is held until such time as the operator has occasion to remove it from the machine.

The xerographic copier 1 illustrated includes an optical system 4 which is capable of scanning across a stationary document on the platen 3 and may also be fixed in position for scanning a moving document advanced across the platen at a constant velocity. The document handler may thus be operated in pre-collation mode in which the documents are delivered in turn to the platen from the storage tray 21 of the document handler 2, copied once and returned to the storage tray, multiple copies of the documents being obtained by circulating and recirculating the documents in sequence. Most conveniently, the optical system 4 is locked in position during this mode of copying and the documents are advanced across the platen at a constant velocity. It is also possible to operate the document handler in so-called stacks mode wherein each document is copied a plural number of times during a single delivery to the platen. For this purpose a registration member or gate 19, which can be moved in and out of sheet blocking position at the registration edge of the platen by means of a conventional solenoid type actuator 19a, is provided for registering the document in stationary position on the platen 3 while the optical system 4 is scanned across the document. Preferably in such mode, the first copy is produced with the optical system fixed in position and the document being conveyed onto the platen at a constant velocity, subsequent copies being made after the document has been registered by unlocking the optical system and scanning it across the document. The stop member or registration gate 19 is in its sheet blocking position as the first copy is formed and the document is fed until it abuts the registration gate 19. If desired, the document feeder can overdrive the document against the gate 19 to insure proper registration. After the document is stopped, the gate 19 may be retracted by actuator 19a. The first exposure of the document is completed by the time it reaches the registration gate 19.

The optical system 4 includes a first scanning mirror 12, a second compensating mirror 13 and a stationary objective lens element 14. Mounted directly behind the scanning mirror is an aperture lamp 11 and a reflector 11a which cooperate to illuminate a longitudinally extending incremental area upon the platen within the viewing domain of the mirror 12. For scanning a moving document being conveyed on to the platen by the document handler the optical system 4 is fixed near its end of scan position at the right hand or entry end of the platen 3. The document is thus copied as the document moves on to the platen. To this end, the document feeder is arranged to move the document at a velocity which is synchronous with the velocity of the drum surface 11. For a 1:1 magnification arrangement the document would move at the peripheral velocity of the drum. This can be accomplished by using a common drive motor, for both the drum 11 and the document feeder as in the case for example in a Xerox 3100 LDC copier. A further description of such a drive arrangement may be had by reference to U.S. Pat. No. 3,900,258.

During precollation copying, in the embodiments illustrated, documents are copied only once during each delivery to the platen 3 and are conveyed across the platen and back to the storage tray 21 without stopping. When making the second and subsequent copies of a document in stacks mode or when copying a document which has been manually placed on the platen, the optical system 4 is arranged to scan across the stationary document. To this end the scanning mirror 12 is supported upon a carriage (not shown) and the carriage is adapted to move back and forth over a prescribed horizontal path of travel below the platen surface upon two parallel aligned guide rails. The scanning mirror 12 as positioned upon the carriage extends transversely across the platen surface in substantially parallel alignment with the registration edge or start of scan margin defined by member 19. The carriage is adapted to move across the platen at a constant rate whereby the mirror 12 scans successive illuminated incremental areas on the document beginning at the start of scan margin, and terminating at the opposite side of the platen.

A second movable carriage (also not shown) is also provided upon which is supported the compensating mirror 13. The second carriage is also slidably mounted upon the guide rails. Compensating mirror 13 is positioned on the second carriage to receive reflected light rays eminating from the scanning mirror 12 and redirecting these light rays back towards the stationary lens element 14.

Although any suitable lens 14 can be employed herein a half lens system comprised of a two component split Dagor system is shown. A reflecting surface is positioned at the lens stop position to reverse the received light rays as they pass through the lens components thus simulating a conventional symmetrical system. The lens system is basically an off axis objective which collects light from one side of the central axis and forms the image on the opposite side of the axis. For a more detailed description and further features of this type of lens, reference is had to U.S. Pat. No. 3,659,922.

A pulley and cable drive system is herein provided to coordinate the movement of the scanning mirror carriage and the compensating mirror carriage as fully described as shown in U.S. Pat. No. 4,018,523.

Having thus described a scanning optical system for providing the stationary document mode of exposure, it is, of course, necessary to provide some means for fixing the optical system in a given position during the moving mode of exposure. As previously described various well known devices for doing this are available, as for example, that exployed in the Xerox 3100 LDC copier, and that described in the above noted U.S. Pat. No. 3,900,258. For purposes of example, however, and without any limitation being intended, a solenoid actuated latch (not shown) engages the optics drive to lock the optics at the end of scan position. The actuation of this latch mechanism is timed off a sensor switch in the document handler and an associated timer. This sensor is the one which coordinates the feeding of the copy sheets with that of the original documents. In operation of the present apparatus, in stacks mode, the first copy is formed by moving original exposure as the document moves on to the platen. As the lead edge of the document is sensed by the sensor switch, the timer provides a reference time interval following which the document feeder is disengaged. During the moving original exposure, the latch holds the optics at their end-of-scan position and the scanning mechanism is disengaged. Following the reference time interval the latch is disengaged allowing the optics to fly-back to its start-of-scan position. Upon sensing by any conventional means (not shown) that the optics have reached the home position, scanning operation is begun as described above. Following the last scanning exposure the optics can be held at the parked end-of-scan position in preparation for the next copying run.

Turning now to FIG. 2, the document handler will be described in greater detail. It comprises storage tray 21, document separator/feeder 20, pre-platen transport T1 for conveying documents to the platen, platen transport T2 and post-platen transport T3 by which documents are returned to the storage tray. In accordance with the invention, the document handler is capable of handling documents longer than the storage tray as well as documents which fit in the storage tray 21.

The document storage tray 21 is mounted over the platen 3 and suitably accommodates 50 documents between 8 inches×10 inches and B4 in size. The tray slopes upwardly towards the separator/feeder 20 at an angle of about 10°. Adjustment of the tray to accommodate different document sizes is as follows. An assembly 44 including a registration cross-beam 48a can be adjusted for paper from 8 inches wide to B4. (Document sheets are placed in the tray so as to be fed long edge first.) The position of the registration edge 48 in minimum (8 inch) and maximum (B4) set feeding locations is indicated.

The registration edge 48 is formed at the front of registration cross-beam 48a. It is formed by an adjustable corner piece (not shown), mounted on the cross-beam 48a, and which also determines side registration, and two registration pads (also not shown) on the cross beam 48a. A driven O-ring stack assist (not visible) positioned approximately in the centre of an A4 size sheet is also mounted on the cross-beam. The corner piece has a generally triangular floor extending between the walls; the front edge of the floor is cut away to accommodate the tray separator pocket (see below) in its position for minimum size documents. Adjustment is achieved by moving the whole assembly 44 on tracks mounted to the side frames and it is locked by a ratchet mechanism acting on a rack along the bottom of the tray. The moving force is provided by the operator who also adjusts the registration corner by sliding it along a friction guide on the front of the cross-beam 48a.

A set counter mechanism (not shown) is mounted on the cross-beam 48a and has a counter arm projecting through the beam so that it can overlie the document(s) in the tray. The arm is pivoted so that as the last document is fed it falls through a slot in the floor of the tray and actuates a sensor. The arm is then returned to the top of the document stack.

An input tray sensor 60 is located on the rear side frame near the lead edge of the tray to sense that there are documents present.

Sheet separation and acquisition is accomplished by a vacuum corrugation feeder (VCF) 20 (FIGS. 2 and 3) using flotation pressure differences between the bottom sheet and the sheets above, sheet corrugation and vacuum. A parabolic contour pocket is cut out at the lead edge of the tray 21 and dished down 3 mm in the manner shown and described in U.S. Pat. No. 4,275,877 issued June 30, 1981. Documents placed in the tray, bridge this gap and form a flotation pocket. Transport belts 22 surface through the document tray within the contour pocket. The transport system consists of five rubber vacuum belts 22, the centre belt 22a being raised 2 mm above the four outer belts. This produces the corrugation when the document is pulled down by the vacuum.

The frequency and size of the holes in the belts 22 regulates the volume of air that can be drawn through them.

The transport belts 22 move across the top plate of the vacuum housing 23 which has open slots or vacuum ports 24 in it coincident with the perforations in the belts. Once again the frequency and size of these slots 24 regulates the volume of air that can be drawn into the vacuum chamber beneath. Set into the top plate is a 2 mm high ramp which lifts the centre belt 22a to form the corrugation effect.

Document stack flotation is accomplished by a frontal assault of air from an air knife 27 (see FIG. 3). The air jet impinges on the tray just in front of the lead edge of the document stack; this permits volumetric flow expansion of air within the pocket contour of the tray and also riffles the front edge of the documents to allow a differential pocket of air between the bottom sheet and sheet 2. This assists in the acquisition, separation and feeding of the bottom document.

The sidewalls of the document tray 21 are vented to allow air to escape and prevent arched inflation of the stack with its resultant multifeeds. The trail edge of the tray is also vented to improve sheet stability and turbulent lift of document trail edge.

Within the vacuum chamber 23 is housed a vacuum flap valve 28 which regulates the timing of the vacuum through the slots 24 in the top plate and belts and hence the acquisition timing of documents. The valve 28 is actuated by a shaft which passes through the side wall of the vacuum housing and is attached to a solenoid 29. A vacuum relief valve 30 is also positioned in one of the vacuum chamber side walls. It is actuated by the chamber pressure, and allows air to the air knife 27, when a document has been acquired by the vacuum transport and effectively closed off the inlet ports to the vacuum chamber 23.

Beneath the vacuum chamber is the scroll-shaped impeller housing containing impeller 23a. Air drawn through the vacuum transport belts 22 and the vacuum chamber 23 is exhausted and ducted to the air knife 27 which is located above the lead edge of the document tray. A pressure relief valve 31 is situated in the duct 32 to control air knife pressure which would otherwise cause document 'blow away' prior to the closed inlet port condition.

A second set of vacuum ports 25 (like the ports 24) is arranged beneath the belts 22 at the forward end of the housing 23 to form a take-away vacuum feed. The ports 25 are controlled by a valve 26 which operates automatically to take away documents which have been acquired at the ports 24 and advanced by the belts 22 over the ports 25. Once the sheet has been picked up by this vacuum feed the valve 28 is closed. Closure of the valve 28 is controlled by a vacuum timing sensor 61 which senses the lead edge of the document. The valve 26 is normally closed and is constructed to open automatically when the ports 25 are closed by the document arriving thereover. As shown in FIG. 2A the valve 26 is mounted in a valve chamber 80 having ports 81 into the vacuum chamber 23. A sealing flap 82 of Mylar (Trade Mark) is attached at one side of the chamber 80 to the valve housing and is biased open by a second Mylar flap 83 similarly attached to the valve housing and with its free end engaging in a slot in the sealing flap 82. The spring flap 83 also serves to damp movements of the sealing flap 82. In operation, the sealing flap 82 is normally closed by the air pressure differential between the vacuum chamber 23 and the valve chamber 80, but when the ports 25 are closed, the leakage between the vacuum chamber 23 and the valve chamber 80 equalises the pressures on opposite sides of the sealing flap 82 which is thus urged to its open position by the spring flap 83.

At the front of the document tray is provided a pair of brushes 33 attached to the front face of the air knife 27. The brushes project down into the document path and the document to be fed is acquired and pulled down to pass beneath the bottom edge of the brushes. This procedure assists in preventing multi-feeding. Documents returning to the tray (as described below) are also prevented from premature acquisition (misfeed/multifeed) since the brush assemblies restrict them from sliding across the documents still in the tray and being acquired out of sequence by the vacuum transport 20.

The pre-platen transport T1 consists of a pair of nip rolls 34, 35, an inner sheet metal and outer plastic inversion guide 38, 39, and the vacuum take-away system described above.

The nip pair 34, 35 is formed by two driven polyurethane rollers 34 mounted on a drive shaft carried on the side frames and two Delrin (Trade Mark) AF idler rollers 35 mounted on a spring-loaded shaft carried by the outer guide 39. The outer guide is hinged off the side frames for jam access. The inversion guide is completed by a portion of inner guide 38 coacting with a fixed guide 10. A cover portion 37 is hinged for jam access.

A pair of polyurethane coated driven input rollers 17 nip with reaction rolls 17a to feed documents to the platen transport T2. The platen transport T2 comprises a single white, wide friction drive belt 16 entrained over input and output transport rollers 18. The document is transported across the platen 3 by the belt 16 at a nominal 0.993×photoreceptor surface speed (to give the same 1.007 magnification which is preferably achieved by the scanning optics). Three gravity rolls 18a apply a nip between the belt 16 and platen 3 and maintain drive across the platen. Belt tensioning and replacement is achieved by adjustment of the roller 18 at the output end of the platen. There are also two tracking guide rollers (not shown), one either side of the belt 16.

The post-platen transport begins with a pair of driven polyurethane exit rollers 52 coacting with Delrin AF idlers 53. Inner and outer guides 40, 41 extend from the exit rollers 52, 53 and serve to invert the documents on their way back to the tray 21. The inner guide is a one-piece plate and the outer guide is formed by a sheet metal guide 41a leading to plastic guides formed by the main cover at 41b and the jam access cover 54 at 41c. A pair of spring-loaded Delrin AF nip rollers 42 are mounted into the access cover 54 and act against a driven pair of polyurethane coated nip rollers 43 which project through the inner guide.

An output switch 63 provides jam detection.

Assembly 44 carrying the registration cross-beam 48a includes a pair of driven nip rollers 46, 47 and a diverter 45. When the assembly 44 is in the position shown in solid lines or in any position between the marks B4 and 8", documents are guided into the nip of rollers 46, 47. When, however, the assembly 44 is moved to a position (shown in dotted lines) beyond the B4 adjustment, diverter 45 crosses the normal path and sends the documents over the assembly 44 along a path between diverter 45 and fixed cover portion 55. Such sheets are guided along this path with the aid of guide ribs 55a on the underside of the cover portion 55.

For the 8" to B4 range the documents are accelerated prior to entering the tray in order to help restacking. The accelerated nip is formed by the rollers 46, 47. A pair of polyurethane coated rollers 46 are mounted on a driven shaft and two Delvin AF idlers 47 are mounted in the upper guide which forms the diverter 45. Between the rollers corrugation idlers are mounted on the driven and idler shafts to corrugate the document. The rollers 46 are driven by a separate motor mounted on the assembly.

Hinged cover portions 37 and 54 provide jam access to the document handler and the pre-platen guides are separable for the same purpose. The whole document handler is pivotally mounted on the copier so that it can be hinged about its rear edge away from the platen. This provides access to the platen and permits manual loading and unloading of documents.

The operation of the document handler will now be described. At the start of a copy run documents are loaded into the recirculating document handler input tray 21. The presence of one or more documents is detected by the input tray sensor 60.

Absence of a document at the input tray sensor 60 when the start print button on the copier is pressed will result in normal operation of the base machine, copies being produced by scanning the platen.

Prior to all copying in precollation, recirculating mode the optics are parked below the constant velocity exposure slit.

Three operating modes are provided by the document handler:

(1) PRECOLLATION MODE

This mode provides for the circulation of sets of documents ranging from 8"×10" to B4 in size, i.e. not larger than the tray 21. All documents in a set must be of the same size. A set of copies is made at each circulation of the documents and copying is done in constant velocity or moving document mode. (An exception to the above occurs when a single document in the above size range is placed in the document handler and multiple copies are selected. In this case the document is copied in constant velocity mode for the first copy and the document is then registered on the platen against the platen registration edge 19. Further copies are then produced by scanning the stationary document.) The presence of a single document is determined by interrogating the input tray sensor 60 after feeding the first document.

On pressing 'start print' (with a document present in the tray 21) the VCF fan motor is run up to speed before a document may be fed. The motor run up time is approximately 3 seconds or less. The flap valve 28 is deenergised (open) during this run up time.

The set counter is energised to place the set counter arm on top of the stack of documents. If the sensor 60 has sensed a document and the set counter sensor is interrupted immediately after pulsing the solenoid a jam is signalled.

The platen belt (16) drive and platen registration edge (19) hold-down solenoid 19a are energised continuously throughout the copy run unless a single document is stopped on the platen and scanned.

Separation of a document from the stack is achieved by the open vacuum valve 28 causing a vacuum to be formed below the bottom document. This vacuum acts through the vacuum belt perforations pulling this document onto the belts 22.

The air knife 27 floats the remaining documents, if present. Following a suitable time for the lowest document to be completely sucked down onto the belts 22 the vacuum transport clutch is energised, causing the belts to move, pulling the lowest document from under the stack.

The document lead edge interrupts the vacuum timing sensor 61 when the document has travelled 20 mm. Interruption of the vacuum timing sensor starts timers which determine when the vacuum transport clutch is deenergised and vacuum valve 28 is closed. The valve 28 closes when the document overlies ports 25 and the valve 26 opens causing the document to be fed into the nip rolls 34, 35. The vacuum transport clutch is then deenergised.

When the document lead edge reaches a synchronising sensor 62 just ahead of the platen transport T2, the copy sheet transport system and the processor cycle are initiated.

Separation of documents continues until the last document in the set, when the set counter sensor is actuated. The set counter thus provides indication of the number of documents in the set. If more than one set has been selected by the operator and the set contains more than one document, the documents are recirculated, until the number of sets requested has been copied.

For sets having a small number of documents an interset delay may be necessary to permit the first document to arrive back in the input tray before it is recirculated. This delay may occur for example for 5 or less documents when documents up to A4 size are being copied, and 4 or less documents when B4 documents are being copied.

Each of the sensors and switches are used to detect jams. Failure of the document to arrive at, or clear a sensor or switch in the allocated time results in a document jam.

(2) LARGE DOCUMENT COPYING

In accordance with the invention, documents longer than the storage tray 21 may be circulated and recirculated through the tray 21 by the document handler. Such large documents, which are also larger (longer) than the platen 3, are copied by transporting them across the parked optics (which effectively defines an exposure slit) with constant velocity.

The platen belt (16) clutch and platen registration edge (19) hold-down solenoid 19a are energised throughout the copying run.

The large document mode may be selected by the operator when one of the paper trays is filled with large, e.g. A3 size, paper and that tray is selected. The large document to be copied is larger than the tray and is positioned with its trail end overlying the cover 55. It is fed short edge first. Documents are copied singly, the required number of copies being selected at the start of the copy run. The registration and output assembly 44 is positioned as shown in dotted lines in FIG. 2 so that the diverter intercepts the normal return path.

Fan motor run-up, separation and feeding all occur as described for precollation copying of normal size documents. Following copying the document is conveyed along the post-platen transport T3 and providing a second document is not detected in the storage tray 21, the document is run out into the tray between the diverter 45 and the fixed portion 55 of the cover. As the document feeds further into the tray 21 gravity causes the lead edge to fall into the tray. If further copies have been selected switch 63 in the return path T3 has started the vacuum transport belts 22 and opened the valve 28 and the document is recirculated. This process continues until the required number of copies have been produced.

(3) NON-SORT MODE

A further possible mode is non-sorted stacks where each document is multiply copied by registration and scan during a single circulation.

Another embodiment of document handler according to the invention, which is also capable of inverting normal size documents during circulation to make duplex-to-duplex or duplex-or-simplex copies, is shown in FIGS. 4 and 5. A tri-roll inverter 72 is incorporated in the document handler in the post-platen transport T3. Compared with the embodiment shown in FIG. 2, the sections 41b and 41c of the outer guide 41 are replaced by a triangular guide 70 having a diverter 71 at its input end. Documents may either be directed through the normal simplex path direct to nip rolls 42, 43 or to the nip between input (73) and common (74) rolls of a tri-roll inverter 72. The inverter 72 also includes a curved buckle chamber 75 dimensioned to accommodate and buckle 8" to 8½" wide sheets. Because of the curved shape of the buckle chamber, the sheet trail edge is carried around the surfaces of foam rollers 76 mounted on the common roll (74) shaft 74a and into the nip between the common rolls 74 and the output rolls 77. The sheet is then guided between the underside of the cover and the guide 70 to the nip rolls 42, 43. The common roll shaft 74a is driven and the input and output shafts 73a, 77a are idlers.

For making copies from duplex original documents, the documents are inverted during each circulation. It will be understood that only documents not larger than the tray 21 may be inverted in this way. Copying of larger documents is carried out in exactly the same way as described above with regard to the simplex document handler of FIG. 2.

It will be understood that although various embodiments of the invention have been described, various changes may be made to the specific details described without departing from the scope of the invention as defined in the appended claims. For example, although as in the embodiments illustrated, documents longer than the try are preferably returned along a different path than other documents in the manner described, all documents may be returned along the same path. Further, although the described embodiments are operated such that when making multiple copies of a document larger than the tray, the document is in continuous motion during its passage through the tray, the document may be stopped momentarily in the tray for registration prior to refeeding.

It will also be understood that while constant velocity moving document copying is preferred for normal size documents during precollation copying, the documents could instead be registered against edge 19 and copied by operating the optical system in scanning mode. Equally moving document copying of the first of multiple copies in stacks mode while preferable is not essential.

What we claim is:

1. In a document copier including a copying station for receiving documents to be copied and optical means for imaging a document at the copying station, and a recirculating document handler having a document storage tray overlying the copying station for holding a stack of plural normal size document sheets and document circulating means for normally delivering said normal size documents in sequence to the copying station from the storage tray and for returning those documents to restack in the storage tray, whereby said normal size documents may be recirculated in sequence for repeated precollation copying; the improvement wherein said document circulating means is also adapted to alternatively continuously plurally recirculate a single document which is longer (in the direction in which it moves) than the storage tray through said storage tray, without restacking, to and from said copying station;

wherein said optical means includes dual mode optical scanning means for selectively scanning a stationary normal document at said copying station or for being positioned stationarily at said copying station for the movement of a longer document therepast, and wherein said document circulating means is operable to convey said single longer document across said copying station past said optical scanning means at a constant speed while said optical scanning means is in said stationary mode, and wherein said optical scanning means stationary mode is selected in response to said recirculation of said single longer document;

wherein said optical means includes scanning means movable for scanning a stationary document on the platen and fixable for scanning said single longer document passed at a constant speed across said copying station;

wherein said circulating means includes a first return path to the tray for documents not longer than the storage tray and a second return path to the tray for documents longer than the storage tray;

wherein the return path for returning documents from the platen to the storage tray includes means movable between a first position for documents not longer than the storage tray and a second position for documents longer than the storage tray;

wherein in the first position of the movable means documents moving along the return path are engaged by advancing means adjacent the storage tray and in the second position of the movable means documents moving along the return path are not engaged by the advancing means;

wherein in the first position of the movable means documents follow a first return path and in the second position of the movable means documents follow a second return path;

wherein the first and second return paths include a common portion;

wherein the common portion of the return paths includes common document advancing means and the unique portion only of the first return path includes further document advancing means, wherein the advancing means comprises coacting drive rolls;

wherein the drive rolls are disengaged in the second position of the movable means;

wherein the movable means acts to divert documents along one or other of the unique portions of the first and second return paths according to its position;

wherein the unique portions of the first and second paths form a unit movable between a position in which the first path portion receives a document from the common portion and a second position in which the second path portion receives a document from the common portion; and wherein said unit includes a fixed diverter and is movable between a first position in which the diverter guides documents along the first unique path portion and a second position in which the diverter guides documents along the second unique path portion; and wherein said unit is mounted on a movable backstop of the storage tray and the position in which documents are guided along the second unique path portion corresponds to the rearmost position of the backstop.

2. A recirculating document handler including document circulating means for delivering documents in turn to a copying station of a photocopier from a storage tray adapted to normally stack plural document sheets and for returning the documents to the tray, whereby the documents may be circulated and recirculated in sequence past the copying station for repeated copying, characterized in that said circulating means is adapted automatically to continuously circulate and recirculate through the storage tray, without stacking, a single document longer (in the direction in which it moves) than said storage tray;

wherein said circulating means includes a first return path for documents not longer than said storage tray and a second return path for documents longer than said storage tray;

wherein the first and second return paths include a common portion leading to first and second unique path portions and having common document advancing means, the first unique path portion only including further document advancing means;

wherein the first and second unique path portions form a unit movable between a position in which the first path portion receives a document from the common portion and a second position in which the second path portion receives a document from the common portion;

wherein said unit includes a fixed diverter; and wherein said unit is mounted on a movable backstop of the storage tray and the position in which the documents are guided along the second unique path portion corresponds to the rearmost position of the backstop.

3. In a recirculating document handling apparatus including document storage means for stacking and restacking a set of plural document sheets and document feeding means for feeding those document sheets from the bottom of a stack thereof in said storage means to the platen of a copier and document restacking means for returning those document sheets from the platen and restacking them on top of said stack in said storage means, for seriatim percollation recirculative copying of the document sheets after they have restacked, the improvement comprising:

alternative large document recirculation means for plurally immediately recirculating a single long document sheet which is longer than said document storage means for making plural sequential copies thereof, said large document recirculation means including diverter means associated with said restacking means, said diverter means being repositionable for said long document sheet so as to intercept the normal document return path through said document restacking means into said storage means for feeding said long document sheet in a different path over rather than into said storage means directly from said restacking means into said document sheet feeding means without stacking for immediate and continuous recirculation of said single long document sheet.

4. The recirculating document handling apparatus of claim 3 wherein said alternative large document recirculation means is coordinated with optical means providing stationary optics copying of said long document by moving it past said optical means at said platen with said document feeding means being operated at a constant speed and wherein said optical means alternatively provides optical scanning means of the other document sheets fed from said storage means with said document feeding means being operated intermittently.

5. The recirculating document handling apparatus of claim 3 wherein said document storage means has a repositionable rear backstop and said repositionable diverter means is mounted on said repositionable rear backstop of said storage means.

6. The recirculating document handling apparatus of claim 4 wherein said document storage means has a repositionable rear backstop and said repositionable diverter means is mounted on said repositionable rear backstop of said storage means.

* * * * *